United States Patent [19]
Hewson

[11] Patent Number: 4,823,541
[45] Date of Patent: Apr. 25, 1989

[54] AGRICULTURAL HARVESTER

[76] Inventor: Glen T. A. Hewson, 116 Broome Street, Cottesloe, Western Australia, Australia, 6011

[21] Appl. No.: 916,481
[22] PCT Filed: Jan. 2, 1986
[86] PCT No.: PCT/AU86/00006
 § 371 Date: Sep. 15, 1986
 § 102(e) Date: Sep. 15, 1986
[87] PCT Pub. No.: WO86/03932
 PCT Pub. Date: Jul. 17, 1986

[30] Foreign Application Priority Data
Jan. 14, 1985 [AU] Australia ................ PG8867

[51] Int. Cl.⁴ .................................. A01D 87/10
[52] U.S. Cl. .................... 56/13.4; 56/320.2
[58] Field of Search .............. 56/13.4, 13.3, 13.1, 56/12.9, 12.8, 13.6, 320.2

[56] References Cited

U.S. PATENT DOCUMENTS

| | | | |
|---|---|---|---|
| 2,777,271 | 1/1957 | Sutton | 56/13.4 |
| 2,779,146 | 1/1957 | Mitchell et al. | 56/13.4 |
| 3,905,181 | 9/1975 | Messner | 56/13.4 |
| 3,916,606 | 11/1975 | Brudnak, Jr. et al. | 56/320.2 |
| 4,121,405 | 10/1978 | Wolf | 56/13.4 |
| 4,226,074 | 10/1980 | Mullet et al. | 56/13.6 |
| 4,335,567 | 6/1982 | Comer | 56/13.4 |
| 4,361,000 | 11/1982 | Friberg | 56/13.4 |
| 4,411,125 | 10/1983 | Strickland | 56/13.4 |
| 4,487,003 | 12/1984 | Mathews et al. | 56/13.6 |

FOREIGN PATENT DOCUMENTS

| | | |
|---|---|---|
| 264584 | 4/1966 | Australia . |
| 421366 | 9/1971 | Australia . |
| 515003 | 1/1980 | Australia . |
| 031158 | 7/1981 | European Pat. Off. . |
| 2352484 | 12/1977 | France ............... 56/13.4 |
| 2053643 | 2/1981 | United Kingdom . |

Primary Examiner—Paul J. Hirsch
Attorney, Agent, or Firm—John S. Hale

[57] ABSTRACT

An agricultural harvesting apparatus (10) comprising a ground engaging housing (12), said housing (12) having an open lower end (14), a cutting and suction blade assembly (38) mounted within the housing (12) for rotation about a substantially vertical axis (20) and comprising a plurality of outwardly extending blade members (40) arranged to cause air to be pushed through the cutting and suction blade assembly upon rotation of the latter, and outlet means (57,48) in the housing (12) for removal of air sucked up by the cutting and suction blade assembly (38) and crop material cut by the cutting and suction blade assembly (38).

10 Claims, 5 Drawing Sheets

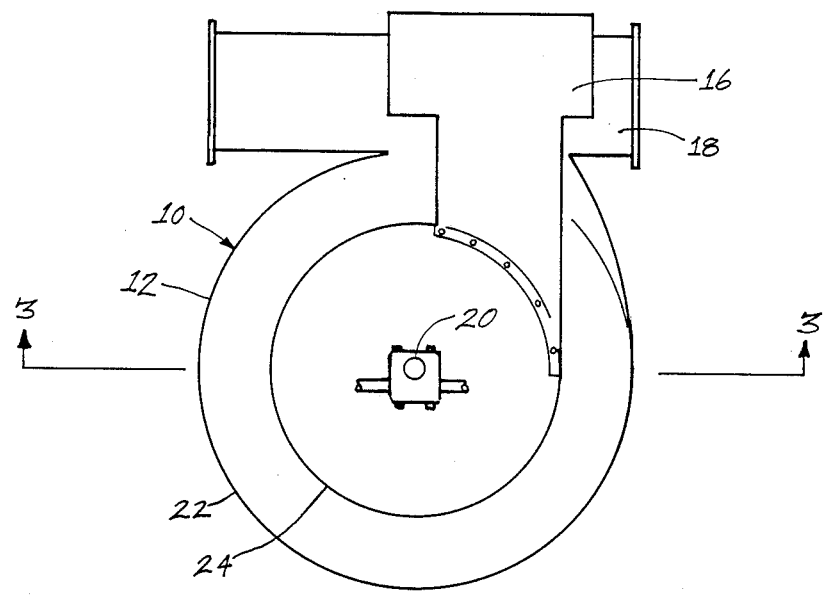
FIG 2.
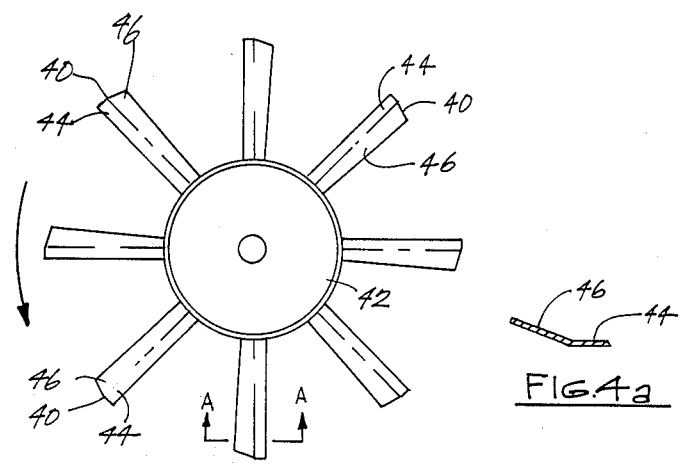
FIG.4
FIG.4a

AGRICULTURAL HARVESTER

DESCRIPTION

The present invention relates to an agricultural harvester.

FIELD OF THE INVENTION

With previously known agricultural harvesters there can be difficulty in harvesting certain crops in certain conditions or in carrying out other tasks. For example, clover or lupins or fallen grain crops can be difficult to harvest. Also, when working in standing stubble, such as when cutting firebreaks or when seeding using direct drilling techniques, it would be useful to be able to cut and deliver straw from the standing stubble and deliver it to the rear of the machinery. Grain crops can become fallen through rain or hail damage and such crops include wheat, oats and lupins.

SUMMARY OF THE INVENTION

Harvesting of crops of the type represented by clover, lupins and fallen grain crops is enhanced by a harvesting apparatus which can lift the crop off the ground. Similarly, working in standing stubble is facilitated by the use of a harvester which can lift the stubble. In accordance with one aspect of the present invention there is provided an agricultural harvesting apparatus comprising a ground engaging housing, said housing having an open lower end, a cutting a suction blade assembly mounted within the housing adjacent the open lower end of the housing, for rotation about a substantially vertical axis and comprising a plurality of outwardly extending blade members arranged to cause air to be pushed through the cutting and suction blade assembly upon rotation of the latter, and outlet mean in the housing for removal of air sucked up by the cutting suction blade assembly and crop material cut by the cutting suction blade assembly.

BRIEF DESCRIPTION OF THE DRAWINGS

The present invention will now be described, by way of example, with reference to the accompanying drawings, in which:

FIG. 2 is a plan view of the apparatus of FIG. 1;

FIG. 4 is a plan view of a cutting and suction blade assembly which forms part of the apparatus of FIG. 1 and which can be seen in FIG. 3;

FIG. 4a is a section through a cutting and suction blade along the line A—A of FIG. 4;

DESCRIPTION OF THE INVENTION

Figure 1:
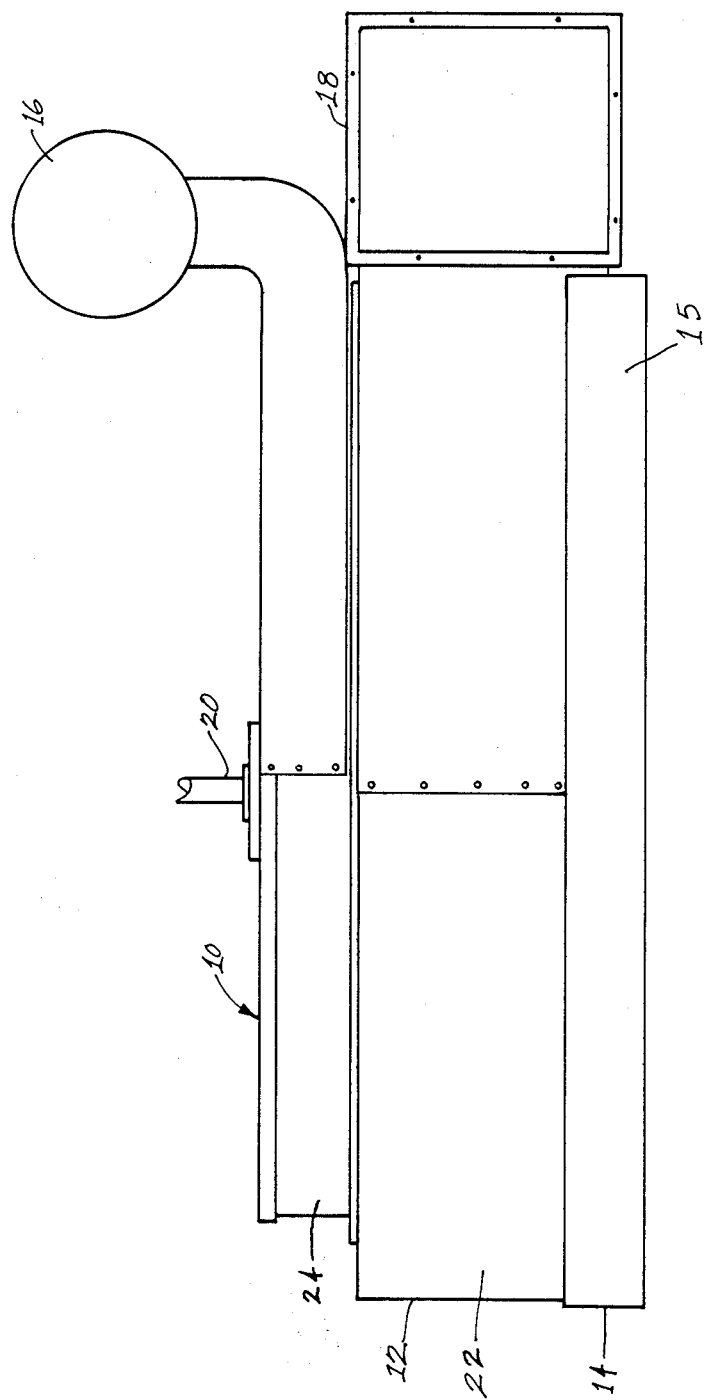
FIG. 1 is a side elevation of an agricultural harvesting apparatus in accordance with the present invention.

In FIGS. 1 and 2 there is shown an agricultural harvesting apparatus 10 in accordance with the present invention which includes a housing 12 which has an open lower end 14. The open lower end 14 is provided with a flexible ground engaging skirt 15 which extends around the exterior of the lower end 14.

The apparatus 10 includes a first outlet duct 16 mainly for air and a second outlet duct 18 mainly for cut crop material and other solid material. The duct 16 is circular but the duct 18 is of square section. The duct 18 has peripheral apertured flanges at each end to enable it to be joined end to end with other ducts 18. The apparatus 10 also includes a vertical shaft 20, the upper end of which can be seen in FIGS. 1 and 2. As can be seen in FIG. 2 the housing 12 has a generally circular shape in plan.

The housing also comprises a lower portion 22 of a relatively large cross section and an upper portion 24 which is small in cross-section compared to the lower portion 22.

Figure 3:
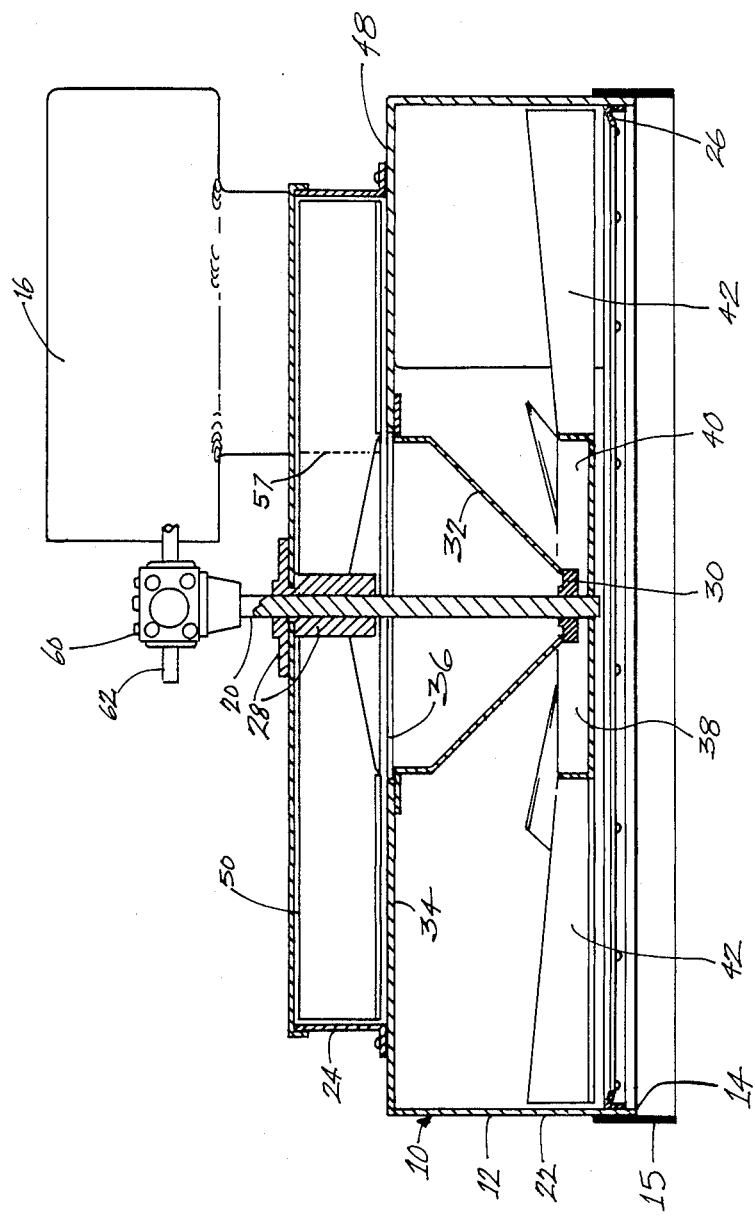
FIG. 3 is a section through the apparatus of FIG. 1 taken along the line 3—3 of FIG. 2.

As can be seen in FIG. 3, the shaft '20 extends downwardly through the portion 22 and 24 of the housing 12 and terminates adjacent the lower end 14 of the housing 12. The lower end 14 is provided with an inturned flange 26. The shaft 20 is mounted to the housing 12 by means of a first, upper bearing assembly 28 and a second lower bearing assembly 30. The second bearing assembly 30 is mounted to the housing 12 by means of a frame 32 which depends from a plate 34. The plate 34 contains a central aperture 36 about the shaft 20 but otherwise separates the upper and lower portions 24 and 22 respectively of the housing 12.

A cutting and suction blade assembly 38 is mounted to the shaft 20 adjacent the open end 14 of the housing 12. As can best be seen in FIG. 4, the blade assembly 38 comprises eight blades 40 which are equiangularly spaced about a central plate 42. The central plate 42 is connected to the shaft 20 and is arranged for rotation therewith. As can best be seen in FIG. 4a, each blade 40 comprises a cutting portion 44 which portion 44 is orientated generally horizontally.

Further, each blade 40 comprises an air suction portion 46 which is canted upwardly at a suitable pitch which may be in the range from about 13° to 15°. In use, the blade assembly 38 is rotated in the direction shown by the arrow in FIG. 4 so that the cutting portions 44 are leading and the air suction portions 46 are trailing. Thus, each cutting portion 44 preferably has a reasonably sharp leading edge to enhance its cuting effect. The upward cant of the trailing portion 46 causes them to induce an air updraft through the blade assembly 38 in a similar manner to the operation of aircraft propellers. Further, the lower portion 22 of the housing 12 also comprises an outlet 48 which leads to the duct 18.

Figure 5:
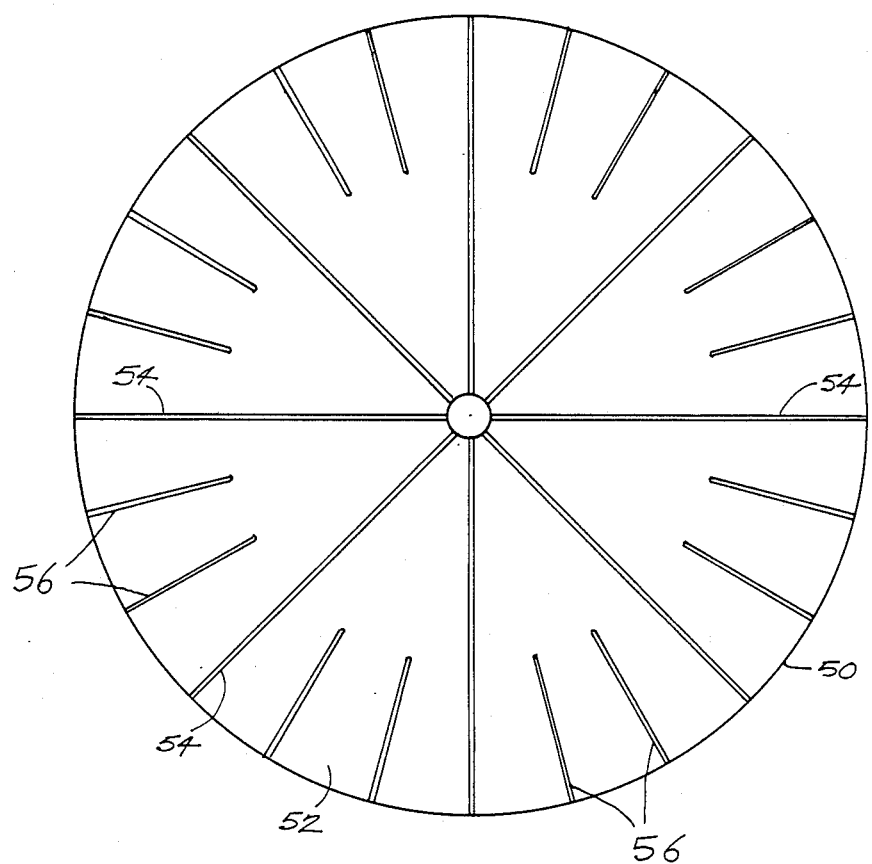
FIG. 5 is an underneath view of an impeller blade assembly which forms part of the apparatus of FIG. 1 and which can be seen in FIG. 3.

The outlet 48 is located outwardly of the upper housing portion 24 and particularly the aperture 36. Also, the upper housing portion 24 contains an impeller blade 50. The impeller blade 50 can best be seen in FIG. 5 and comprises a flat circular backing plate 52. Eight equiangularly spaced elongated blades 54 depend from the plate 52 and extend from the shaft 20 radially to the periphery of the plate 52. Further, a plurality of short radially extending blades 56 extend from an intermediate point on the plate 52 to the periphery of the plate 52. Further, the upper portion 24 of the housing 12 has an outlet 57 for air, which outlet leads to the duct 16.

Further, the shaft 20 has mounted at its upper end a T-drive gearbox 60. The T-drive gearbox 60 is connected to a drive shaft 62 which is connected to a suitable source of power such as an independent motor or a power take off of a tractor or the like.

In use, the shaft 62 is rotated by its drive means and this causes the shaft 20 to rotate about a substantially vertical axis. Rotation of the shaft 20 causes the plate 42 and therefore the whole of the blade assembly 38 to rotate in the counter clockwise direction as seen in FIG. 4.

This causes air to be sucked from underneath the skirt 15 and through the lower end 14 of the housing 12. The sucking of the air is caused by the rotation of the portions 46 of the blades 40.

Further, the impeller blade 50 is also caused to rotate. The blades 54 and 56 of the impeller blade 50 tend to cause the air to be directed outwardly by centrifugal force.

The apparatus 10 is, in use, activated over an area of ground containing a crop or stubble to be treated. Rotation of the blade assembly 38 causes the air updraft mentioned above to be induced. This air updraft tends to lift a fallen crop or stubble and also to pick up seed such as lupin seed, which has fallen to the ground. Simultaneously, the blades 44 cut the lifted crop or stubble material and cut crop material is sucked up by the updraft. Further, this solid material being relatively heavy tends to be directed outwardly towards the margin of the lower portion 22 of othe housing 12. Thus, the solid material is directed towards the outlet 48 and then into the duct 18. On the other hand much of the air sucked up by the blade assembly 38 is directed upwardly through the central aperture 36 about the shaft 20 into the upper compartment 24. The air directed into the upper compartment 24 is then directed outwardly by centrifugal force caused by rotation of the blades 54 and 56 on the plate 52. The outwardly directed air is directed towards the outlet 57 and then into the duct 16.

Figure 6:
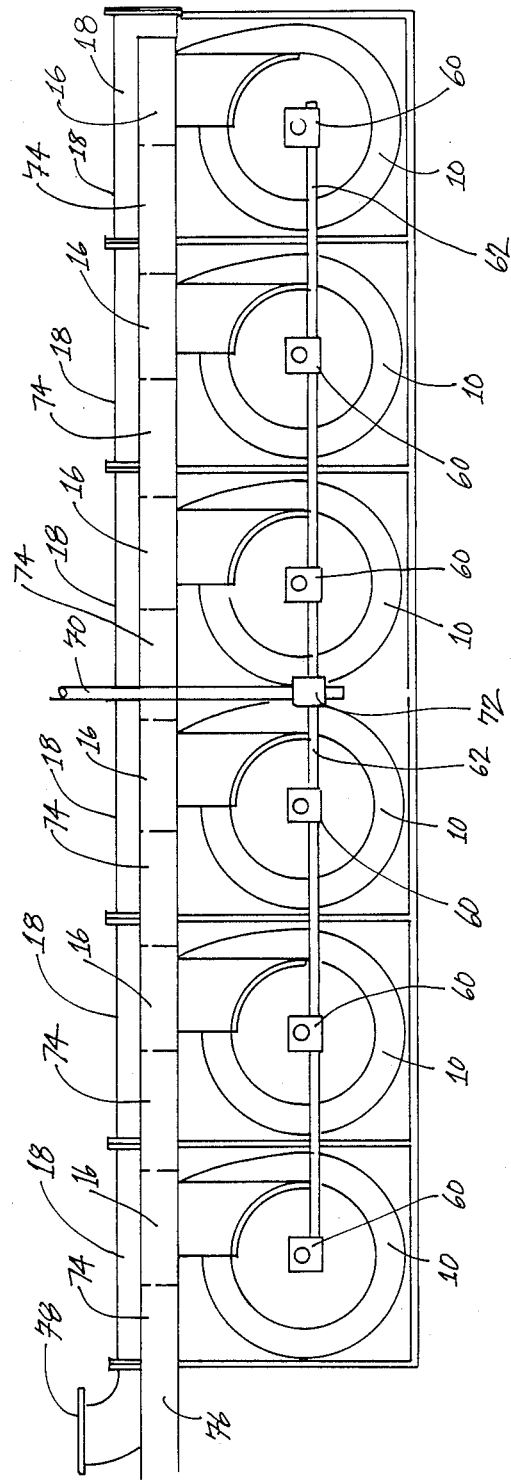
FIG. 6 is a plan view of a harvesting apparatus in accordance with the present invention comprising a plurality of the units shown in FIG. 1 mounted in side by side manner and arranged to be driven from a common source.

As shown in FIG. 6, it is envisaged that a number of the apparatuses 10 would be connected together in side by side manner. They would all be driven by a single drive shaft 62 through respective T-drive gearboxes 60. Further, there could be a common power shaft 70 which connects the shaft 62 to a suitable source of power as discussed above via a gearbox 72. Still further, the ducts 16 and 18 of all the apparatuses 10 would be coupled toether in end to end manner. The ducts 18 would be connected together directly by means of their flanges and a suitable joining means located in the apertures of the flanges wilst the ducts 16 would be connected togethr by means of lengths of hose 74. Thus, there would be a common exhaust outlet 76 from the ducts 16 mainly for air and a common outlet 78 from the ducts 18 mainly for cut crop material and other solid matter. Further, it is envisaged that the air draft from the outlet 76 could be used to perform useful work such as operating machinery or the like.

The solid material from the outlet 78 is passed to a rotating screen or the like to remove sand and other particulate contaminant material, and then the crop material is passed into a standard grain harvester for threshing and cleaning. Alternatively, when dealing with stubble or grass or foliage the cut material can simply be dumped to the rear. Modifications and variations such as would be apparent to a skilled addressee are deemed within the scope of the present invention.

I claim:

1. An agricultural harvesting apparatus which comprises a ground engaging housing, said housing defining an open lower end, a suction blade assembly mounted within the housing adjacent the open lower end of the housing for rotation about a substantially vertical axis and comprising a plurality of outwardly extending blade members arranged to cause air to be sucked through the suction blade assembly and to suck up crop material upon rotation of the suction blade assembly, a first outlet means in the housing mainly intended for removal of said air and a second outlet means in the housing mainly intended for removal of said crop material, an impeller blade assembly mounted in the housing for rotation about a common axis with the suction blade assembly, said impeller blade assembly comprising a backing plate and a plurality of depending outwardly extending blades mounted to said backing plate, said impeller blade assembly being positioned above the suction blade assembly and adjacent the first outlet means, said suction blade assembly being positioned adjacent the second outlet means.

2. An agricultural harvesting apparatus according to claim 1 wherein the housing is divided into a lower portion containing the suction blade assembly and an upper portion containing the impeller blade assembly, and the upper and lower portions being in communication through a central aperture located about the axis of rotation of the suction blade assembly, and the lower portion contains the second outlet means and the upper portion contains the first outlet means.

3. An agricultural harvesting apparatus according to claim 1 wherein the suction blade assembly comprises a plurality of equiangularly disposed blade members.

4. An agricultural harvesting apparatus according to claim 1 wherein each blade member has a canted up portion arranged to cause air to be sucked through the suction blade assembly upon rotation of the latter.

5. An agricultural harvesting apparatus according to claim 1 wherein the suction blade assembly is mounted on a shaft which is arranged to be rotatably driven by a power source.

6. An agricultural harvesting apparatus according to claim 1 wherein the housing is substantially circular in plan vivew and said first outlet means and said second outlet means are positioned tangentially to the housing.

7. Ann agricualtural harvesting apparatus as claimed in claim 1 comprising a plurality of units connected together in side by side manner, having their respective first and second outlet means connected into a common outlet conduits and having interconnected drive means coupled to a common power source.

8. An agricultural harvesting apparatus according to claim 3 wherein there are more than four blade members.

9. An agricultural harvesting apparatus comprising a ground engaging housing, said housing having an open lower end and an upper end which is devoid of air inlet means, a suction blade assembly mounted within the housing adjacent the open lower end of the housing for rotation about a substantially vertical axis and comprising a central rotatable member having a plurality of blade members extending outwardly therefrom, each blade member having a first, inner end adjacent the central rotatable member and a second, outer end remote from the central rotatable member, wherein the blade members are profiled for substantially the entire distance between their first and second ends such that upon rotation of the suction blade assembly air is caused to be sucked through the open lower end of the housing and then through the suction blade assembly and removed from the housing through an outlet means while crop material is also sucked up by the suction blade assembly and removed from the housing through a second distinct outlet means.

10. An agricultural harvesting apparatus according to claim 9 wherein each blade member has a canted up portion extending for substantially the entire distance between the first and second ends.

* * * * *